Patented Oct. 11, 1938

2,132,730

UNITED STATES PATENT OFFICE 2,132,730

HYDRAULIC BRAKE

Harvey D. Geyer, Dayton, Ohio, assignor to General Motors Corporation, Detroit, Mich., a corporation of Delaware Application August 7, 1935, Serial No. 35,076

2 Claims. (Cl. 60—54.6)

As ordinarily constructed the wheel cylinder in a hydraulic brake system for motor vehicles contains a movable piston bearing directly on the cylinder wall and requires the use of two seals. A dust seal is used in an attempt to exclude dirt and thereby reduce abrasion on the sliding bearing surfaces and a liquid seal is used to retain the actuating fluid. It is proposed according to the present invention to improve on such conventional structure by eliminating the metal to metal contact of a piston and cylinder through the very simple expedient of interposing a sleeve of elastic deformable material which not only accommodates relative movement but also serves as a seal and remains unaffected by dirt on the outside. As distinguished from the conventional piston seal in the form of a cupped washer whose action is dependent upon internal pressure to force the washer flange tightly against the cylinder wall, resulting in a frictional drag on the piston, the present seal does not in any material way divert energy for piston actuation except such as is needed to overcome the yielding resistance of the elastic sleeve. The loss, however, can be compensated by the use of weaker return springs inasmuch as the elasticity of the sleeve has a natural tendency to restore the parts upon release of pressure, and practically speaking no comparable loss occurs.

Figure 1:
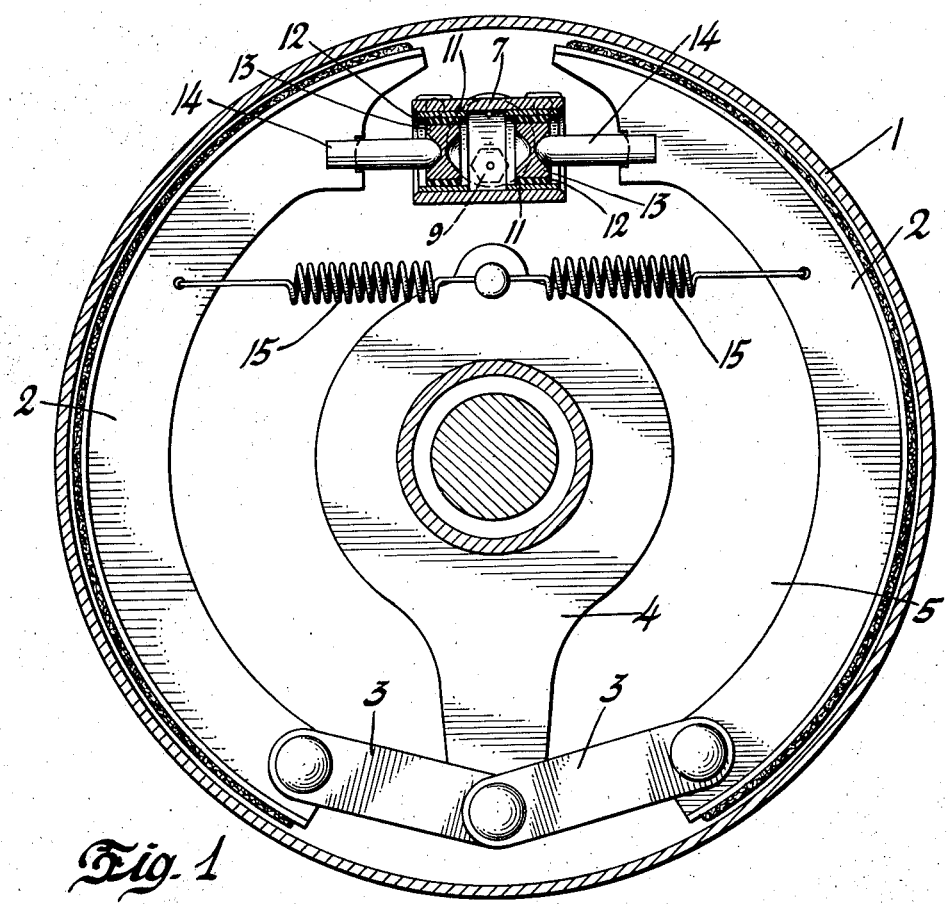
Figures 2, 3, 4:
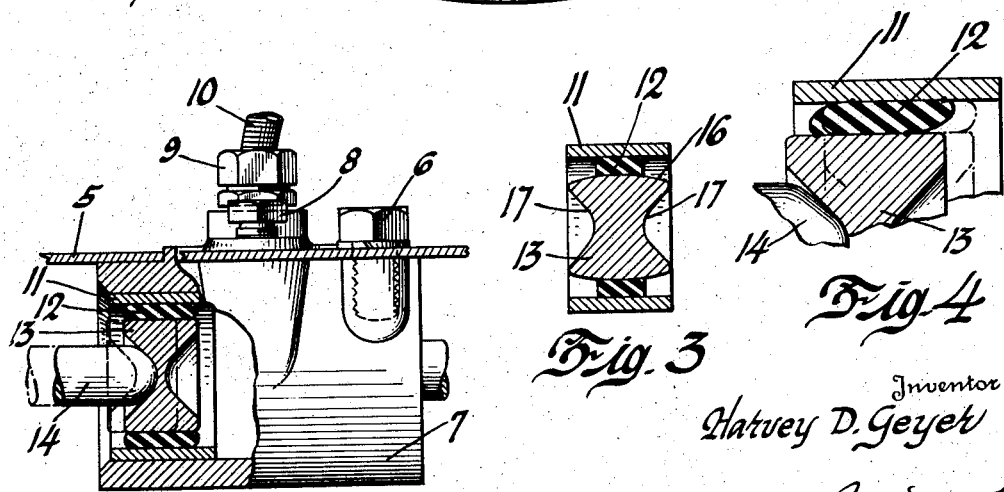

A specific embodiment herein described as the best known mode of applying the invention is characterized by its simplicity and few parts and is calculated to save considerable cost in manufacture and to operate properly over a long period without attention or expense. In its manufacture a sleeve of rubber may be interposed between and surface bonded to an outer steel ring and a central piston or slug of relatively soft steel and thereafter the central slug is coined to expand the same radially and bulge the rubber axially beyond the zone of surface bonding. This unit, when press fitted into the end of a cylinder, provides a closed fluid pressure chamber in which the piston reciprocates in response to internal pressures to actuate brakes. Other modes of applying the invention may be followed and the device may be used also as a master cylinder and elsewhere as a pressure responsive device or the like. For a better understanding of the invention reference should be had to the accompanying drawing, wherein Figure 1 is a vertical sectional view of a motor vehicle wheel brake showing the application of my improved pressure responsive device; Figure 2 is an enlarged view partly in section showing the mounting of the wheel cylinder; Figure 3 is a detail sectional view showing parts of the piston unit prior to the coining operation, and Figure 4 is an enlarged fragmentary sectional view showing the piston in brake applying position.

In the drawing the numeral 1 indicates a brake drum to be carried by a road wheel and 2—2 are internal expanding brake shoes carrying friction material for engagement with the drum. The lower ends of the shoes are shown pivoted by swinging links 3—3 to a fixed anchor bracket 4 associated with the wheel backing plate 5. Mounted on the backing plate, as by means of studs 6 between the upper ends of the shoes 2—2, is a wheel cylinder 7 having associated therewith in the usual fashion a bleeder plug 8 and a fitting 9 for connection with a pressure line 10. The pressure line or conduit 10 connects the interior of the wheel cylinder with a master cylinder or other similar device under control of the vehicle operator for supplying fluid under pressure to actuate the brakes.

Where the wheel cylinder is fixed with the backing plate the opposite ends thereof may be closed by a piston unit shown in the drawing as including an outer metal ring 11, a sleeve 12 of rubber or other elastic deformable material relatively thin, and a centrally disposed piston 13. If a floating cylinder is used a single piston unit at one end only of the cylinder will afford sufficient movement for actuating the brakes. A convex seat in the piston engages the rounded nose at one end of a plunger 14, the opposite end of which is split to straddle the brake shoe flange for the actuation of the brake shoes against the resistance of one or more return springs 15.

In the manufacture of the piston wall unit the parts are initially formed and assembled as seen in Figure 3. Here the piston part 13 has a rounded or convex peripheral surface in cross section as at 16 and the opposite sides are indented slightly as at 17. After the rubber ring 12 has been inserted between the inner member 13 and the outer sleeve 11 its inner and outer surfaces are vulcanized or otherwise surface bonded to the metal parts. A coining operation on the inner member 13 by the entrance of suitable tools to the recesses 17 for the application of endwise pressure thereon serves to decrease the axial dimension of the piston member and expand it diametrically, whereby the convex periphery becomes more nearly cylindrical. This expansion of the central member places the rubber adjacent thereto under a circumferential tension, causing the rubber to hug the piston more tightly without destroying the surface bond and also crowds the rubber radially toward the outer ring 11. As a result of the displacement the sides of the rubber ring bulge outwardly, or in other words the axial dimension of the rubber increases and bears tightly against the inner and outer members beyond the zone of vulcanization. Because of this stressing of the rubber sleeve its elasticity tends to keep the parts centered and restore the parts to normal position after braking pressures are relieved. Due to the compressive stress on the rubber and the outward bulging thereof it accommodates relative endwise movement of the piston by what may be termed a rolling action of the rubber particles and such action has no tendency to destroy the effectiveness of the seal.

As will be obvious, the outer ring 11 can be omitted, in which case the elastic sleeve for the floating piston may engage directly with the interior of the cylinder. The use of the ring, however, provides a unit assembly which facilitates handling during manufacture, particularly with reference to the coining operation. Its assembly with the cylinder by a press fit is a simple matter. In this connection it should be noted that the interior of the cylinder is of uniform diameter from end to end and its production, therefore, involves no expensive machine operation.

With this end wall unit press fitted into the pressure chamber, there is provided a completely sealed or closed system which not only insures against loss of the rather costly hydraulic fluid, but remains substantially unaffected by outside dirt and moisture.

I claim:

1. In a fluid pressure responsive device, an outer housing, a floating piston within the housing, a sleeve of elastic deformable material spacing the piston and housing and having in a zone axially intermediate its ends a surface bond with both the piston and housing, whereby relative movement is accommodated by a rolling action of the elastic deformable material.

2. In a fluid pressure responsive device, a piston and a casing spaced radially of each other, and a sleeve of elastic deformable material interposed between and surface bonded to the piston and to the casing, said sleeve having a radial dimension initially greater than said space, and as a result of its crowding in the space, being axially bulged into contact with the piston and casing beyond the zone of surface bond.

HARVEY D. GEYER.